United States Patent [19]
Page

[11] Patent Number: 5,232,246
[45] Date of Patent: Aug. 3, 1993

[54] LIQUID RESERVOIR TRAILER HAVING WHIRLPOOL PREVENTION BAFFLES

[76] Inventor: Jourdan T. Page, 237 Lowell La., Carrollton, Ga. 30117

[21] Appl. No.: 797,398

[22] Filed: Nov. 25, 1991

[51] Int. Cl.$^5$ .................... B60P 3/22; B65D 88/54; B65D 90/00

[52] U.S. Cl. .................... 280/837; 280/839; 280/475; 280/DIG. 8; 220/563

[58] Field of Search .................... 280/7, 836, 837, 838, 280/839, 656, 47.33, 79.2, 475, DIG. 8; 169/24, 62, 52, 91; 138/37, 39, 40; 220/563, 731, DIG. 24

[56] References Cited

U.S. PATENT DOCUMENTS

| | | | |
|---|---|---|---|
| 37,461 | 1/1863 | Scott | 220/563 |
| 269,777 | 1/1882 | Cronin | 169/24 |
| 882,098 | 3/1908 | Chial | 280/839 X |
| 1,165,736 | 12/1915 | White | 280/839 X |
| 1,394,742 | 10/1921 | Kramer | 220/563 X |
| 1,828,169 | 10/1931 | Blanchard | 169/24 |
| 2,192,593 | 3/1940 | Bradley et al. | 280/837 |
| 2,879,785 | 3/1959 | Vesterdal et al. | 280/839 X |
| 3,473,679 | 10/1969 | Weichel | 280/839 X |
| 4,241,755 | 12/1980 | Snyder | 280/837 X |
| 4,251,005 | 2/1981 | Sons et al. | 280/837 X |
| 4,482,017 | 11/1984 | Morris | 169/24 |
| 4,483,454 | 11/1984 | Rogers et al. | 220/563 X |
| 4,819,955 | 4/1989 | Cobb | 280/837 |

FOREIGN PATENT DOCUMENTS

| | | | |
|---|---|---|---|
| 1551614 | 3/1990 | U.S.S.R. | 220/563 |
| 0692896 | 6/1953 | United Kingdom | 220/563 |

OTHER PUBLICATIONS

FOL-DA-Tank ® brochure, Summer 1988, distributed by FOL-DA-TANK Company ®, Rock Island, Ill.

Primary Examiner—Brian Johnson
Attorney, Agent, or Firm—Jones & Askew

[57] ABSTRACT

A portable liquid reservoir comprising an open container mounted on a moveable frame. The reservoir is intended for fire fighting and has a liquid drain in which whirlpool prevention devices are incorporated to prevent the formation of whirlpools and allow water to be removed from the reservoir at a relatively high rate.

14 Claims, 4 Drawing Sheets

LIQUID RESERVOIR TRAILER HAVING WHIRLPOOL PREVENTION BAFFLES

TECHNICAL FIELD

The present invention relates generally to a portable liquid reservoir and, more specifically, to a portable water reservoir for fire fighting.

BACKGROUND OF THE INVENTION

In rural and remote areas which lack an adequate and accessible water supply, or in areas where water pressure is low, an extra water supply is often necessary when fighting fires. In such situations, a portable water reservoir is useful for storing and delivering water at the scene of the fire.

Upon arrival at the scene of a fire, the portable reservoir is assembled and positioned in proximity to the fire. Water is transported by land and emptied into the reservoir. Depending on the construction of the reservoir, water may be dumped into the top of the reservoir, known as a "dump tank", or may be pumped in through inlet hoses. After filling, fire hoses from a pumper truck are attached to the reservoir and water is pumped directly from the reservoir onto the fire. As the reservoir is emptied, the water is replenished by the water transport system. When the fire has been extinguished, the apparatus is removed from the scene of the fire.

A variety of factors affect the utility and efficiency of a portable liquid reservoir. These factors include the speed with which the portable reservoir can be transported to a desired location, positioned properly, and assembled for use; the rate at which the reservoir can be filled with liquid; the volume of liquid the reservoir can hold; the rate at which the reservoir can be drained of liquid; and, the volume of liquid which can be efficiently removed form the reservoir.

The speed with which a portable reservoir can be transported, assembled and positioned at a desired location depends on its construction and the steps necessary to ready it for use. In the past, portable reservoirs have been constructed as free-standing canvas tanks which require assembly prior to use, or as trailer tanks which require no assembly. The free-standing dump tanks are comprised of a metal or plastic frame and a canvas lining into which large volumes of liquid may be dumped. The free-standing dump tanks are brought to the scene of the fire disassembled or collapsed and are then manually assembled by the fire fighters. The trailer tanks are towed to a desired location, either empty or full depending on their particular construction, and are then positioned as convenient.

The fill rate of a reservoir depends on the size of the opening through which the liquid is to be delivered into the reservoir. This, in turn, depends on whether the tank is of open or closed construction. The fill rate of enclosed reservoirs is slower due to the build up of air pressure within the tank and the limitations on fill rate imposed by the diameter of the fill openings.

The volume of the reservoir obviously depends on its size. Reservoirs may be designed in a variety of shapes and sizes to accommodate the individual fire fighting needs of a fire department.

The rate at which liquid is drained from a reservoir depends on the diameter of the pipes through which the liquid can be drained, the number and size of the openings through which the liquid can be drained, the pumping capacity of the pumper truck, and whether the reservoir is of open or closed construction. The air pressure in an enclosed tank may be somewhat reduced as liquid is rapidly pumped from the tank, thereby reducing the rate at which liquid may be removed.

Finally, the efficiency of a particular reservoir design depends greatly on the volume of the stored liquid which can actually be removed from the reservoir. When liquid is being drained from a reservoir, suction loss is created by the development of whirlpools at the drainage site. When the bottom of the whirlpool contacts the drainage site, suction is interrupted and no more liquid can be removed from the reservoir. The rate of draining liquid from the tank also affects the formation of whirlpools. With many types of reservoirs, a specific volume of liquid contained therein may not be extracted because of the whirlpool phenomenon. This reduces the efficiency of a particular reservoir because it must be refilled more often.

A variety of dump-tanks or other portable reservoirs have been developed to address the considerations enumerated above. U.S. Pat. No. 2,192,593 to Bradley et al., discloses a trailer tank in which the trailer frame itself has been incorporated into the body of the tank. The particular tank disclosed in the patent is a cylindrical enclosed tank designed for land distribution of liquid commodities, similar to tanks used to transport fuels or milk.

U.S. Pat. No. 4,482,017 to Morris, discloses a portable, enclosed liquid supply tank designed to correct the disadvantages of earlier enclosed tanks by including an overflow relief valve and a fill valve. The fill valves or "air holes" are designed to stabilize the pressure between the inside and the outside of the tank when filling or draining. A drain pipe extends from the rear of the tank to allow removal of the liquid. Despite the presence of fill valves and air holes, the rate at which liquid may be removed from the tank is limited by the diameter of the fill valves and the number of air holes. Additionally, the apparatus disclosed in the Morris patent does not provide a method for preventing the development of suction whirlpools, thereby allowing more efficient use of the liquid contained in the tank.

Vinyl of canvas tanks which are assembled at the scene of the fire are also common portable reservoirs. However, these tanks are cumbersome and difficult to assemble. They also have no devices which aid in the prevention of whirlpools, and suction hoses placed in such tanks must have a whirlpool-inhibiting device fitted into the inlet end of the hose. Furthermore, experience indicates that the materials composing these devices are subject to decay if not dried prior to disassembly, and that the tanks must be treated carefully prior to storage and reuse.

Thus, what is needed in the art is a portable liquid reservoir which is formed of a durable material, is easy and quick to assemble, is easily positioned and maneuvered, and allows more efficient use of the liquid contained therein by preventing the development of whirlpools. The present invention solves these problems in the art by providing a portable liquid reservoir that contains anti-whirlpool devices which enable a pumper truck to withdraw virtually every gallon of water before breaking suction; which can be assembled and positioned by one person in less time than supply tanks currently available; and, which can be immediately stored after use without taking any precautions to dry the material and without damage to the tank material.

SUMMARY OF THE INVENTION

The present invention is directed to an improved portable reservoir in the form of a trailer to be towed empty to the scene of a fire. Once at the fire scene, the open-top reservoir becomes available for storing and delivering liquid. A drain pipe runs along the bottom of the reservoir and contains one or more openings of varying sizes for withdrawing liquid from the reservoir and venting air. These openings are covered by anti-whirlpool devices which reduce the formation of whirlpools and increase the volume of water which may be extracted from the reservoir before breaking suction, thus improving the efficiency and utility of the reservoir during fire fighting.

The anti-whirlpool devices comprise one or more baffles which are staggered along the length of the drain pipe such that the baffles break up of diffuse the most direct paths from the openings to the surface of liquid in the tank. The baffles are designed to contain a plurality of irregular openings and are positioned in close spaced-apart relation to the drain pipe. The baffles may be layered on top of one another to enhance their anti-whirlpool activity. Thus, the numerous openings present in the baffles break up the laminarity of the flow of the liquid and prevent whirlpools from forming.

Described somewhat more particularly, the present invention provides a container similar to an open trailer formed of a suitable material and having an open top. The container has a built-in axle and wheels but may also be designed as a separate container configured for placement on a mobile trailer frame and attached thereto in any convenient manner.

Described in greater detail, the sides of the container are equipped with a plurality of stabilizing legs which are retracted when the reservoir is being transported. Each stabilizing leg has a stabilizing foot at its bottom to distribute the weight of the reservoir more evenly when the leg is extended. The stabilizing legs are positioned on either side of the container directly opposite from one another to afford maximum support. The legs are locked at a desired height by any convenient mechanism for maintaining an extension at a particular length or height.

A drain pipe is positioned along the bottom of the container such that the pipe runs the length of the container, preferably perpendicular to the axle and midway between the sides of the container. The bottom of the container may slope towards the drain pipe to aid in removing the liquid. The drain pipe extends out the front or the rear of the container, or at both ends, and joins suitable couplings and valves allowing selective connections to the suction hose of at least one pump.

The drain pipe has a series of openings along its length inside the walls of the container. Two types of openings may be found in the drain pipe. The openings along the top of the drain pipe are vents. They are narrow slits which serve to vent air when the reservoir is being filled or liquid is being removed. Because of their small size, their utility for draining the reservoir is limited. The openings along the sides of the drain pipe are intake holes. They serve to drain liquid from the reservoir when the pumper truck is engaged. The intake holes increase in size towards the center of the drain pipe. Thus, those intake holes in the drain pipe nearest the walls of the container are smaller than the intake holes near the center of the drain pipe. The openings are sized to allow a maximum amount of liquid to be withdrawn from the container.

The vents and intake holes along the length of the drain pipe are enclosed by anti-whirlpool baffles designed to break up the flow of the liquid through the openings and thereby prevent the formation of whirlpools. The anti-whirlpool baffles are designed to shelter or partially shelter the intake holes and vents, but do not block the intake holes or vents. The anti-whirlpool baffles may have various sizes and shapes so long as the baffles are sized and located relative to the openings in the drain pipe to function as barriers interposed between the openings and the surface of liquid in the tank. Two or more anti-whirlpool baffles may be layered one on top of another to enhance their anti-whirlpool activity. The baffles impede the nominal straight path to the liquid surface and may induce liquid flow through several streams each of which has less flow than the total flow into the particular drain hole in the pipe, thereby reducing whirlpool formation in the streams.

Thus, it is an object of the present invention to provide a portable liquid reservoir for storing and delivering liquids.

It is a further object of the present invention to provide a portable liquid reservoir from which nearly all stored liquid can be withdrawn before suction is broken.

It is another object of the present invention to provide a portable liquid reservoir which can be quickly positioned and readied for receiving liquid.

It is a further object of the present invention to provide a portable liquid reservoir which can immediately be stored without damage to the materials from which it is constructed.

It is another object of the present invention to provide an apparatus and method for preventing the formation of whirlpools when liquid is being extracted from a container.

Other objects, features and advantages of the present invention will become apparent upon review of the following detailed description of a preferred embodiment and the appended drawings.

DETAILED DESCRIPTION OF THE PREFERRED EMBODIMENT

Figure 1:
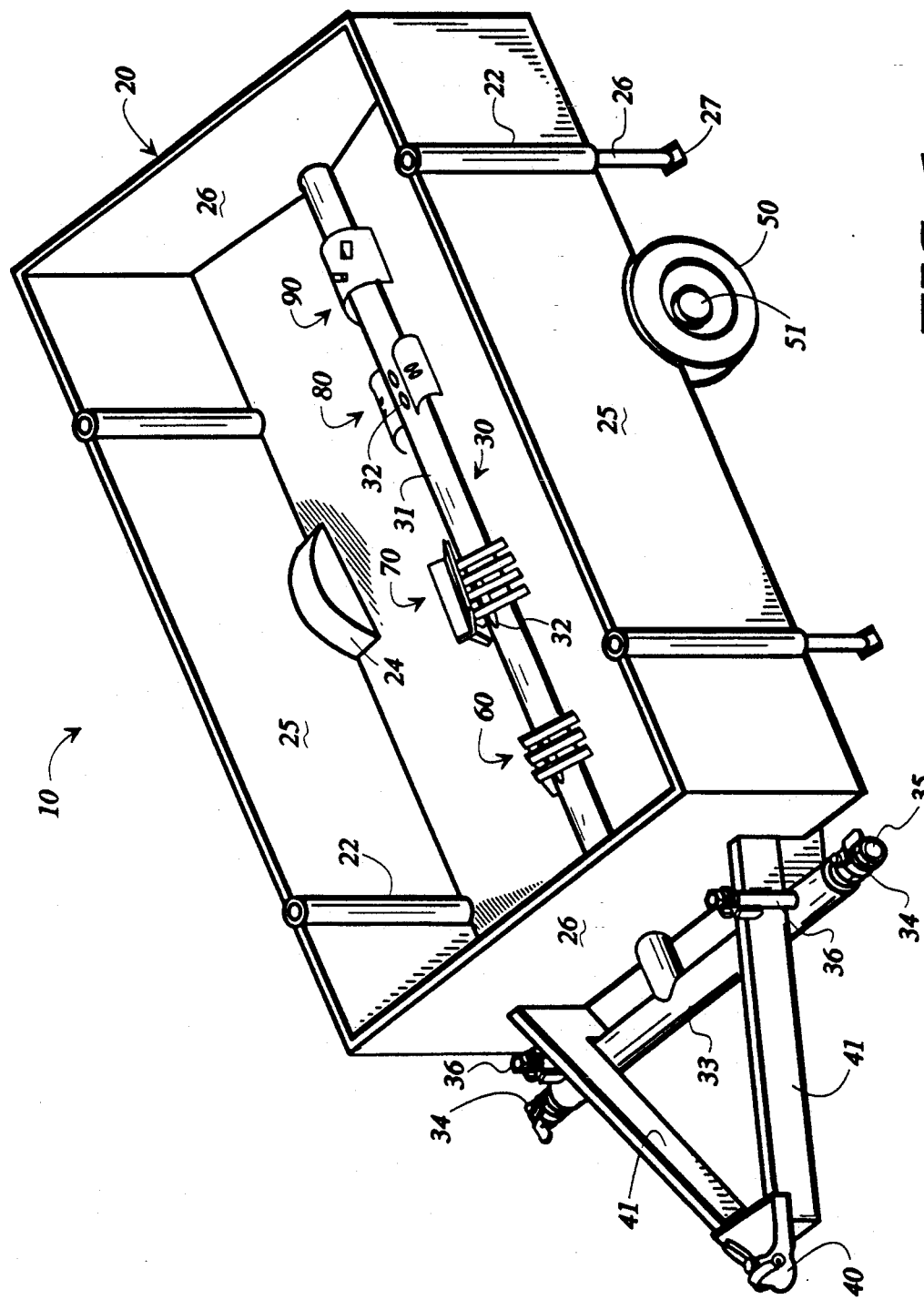
FIG. 1 is a pictorial view of a preferred embodiment of the present invention, including several alternative embodiment of the anti-whirlpool device of the present invention.

Referring now in more detail to the drawings, in which like numbers refer to like elements throughout the several views, FIG. 1 shows a portable liquid reservoir 10 according to the present invention. The portable liquid reservoir 10 comprises a container 20 similar to an open trailer and including a drainage system 30 located within the container; and a transport and frame subassembly comprising a pair of wheels 50, an axle 51, and a hitch 40 located on the frame members 41 extending forwardly from the front end of the reservoir 10.

The container 20 is rectangular in plan view, having two pairs of parallel sides. Two sides 25 extend the length of the container and are spaced apart and parallel to each other but perpendicular to the axle 51. The other two sides 26 traverse the width of the container and are spaced apart and parallel to each other and to the axle 51.

Figure 7:
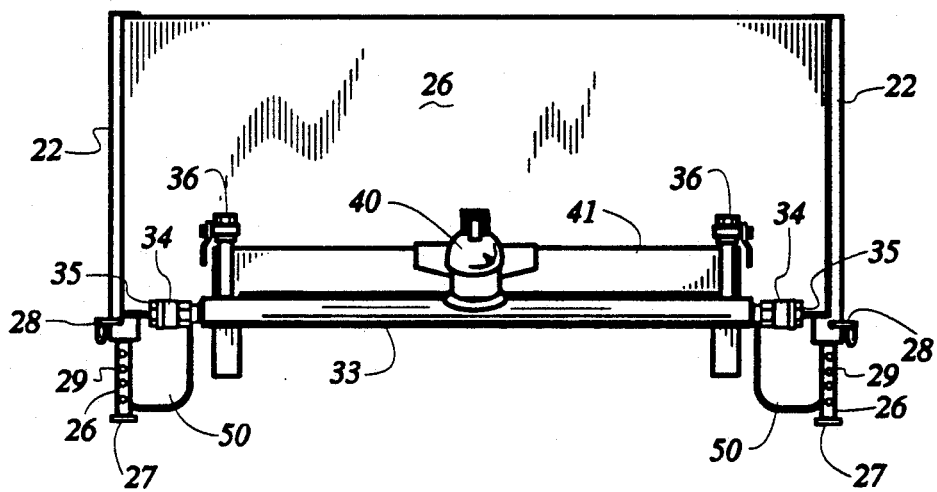
FIG. 7 is a front end view of the embodiment shown in FIG. 1.

Wheelwells 24 are built into two sides 25 of the container 20. Also built into the container are leg pockets 22 for retaining the stabilizing legs 26 when the container 20 is not in use or is being transported. The stabilizing legs 26 may be withdrawn from the leg pockets 22 to stabilize the container 20 when in use. The stabilizing legs 26 rest upon feet 27 which serve to distribute the weight of the container 20 on the ground so that the stabilizing legs 26 do not become embedded in the surface upon which they rest, and to afford the best distribution of the weight of the container 20. FIG. 7 illustrates a method for maintaining the stabilizing legs 26 at a desired height by inserting a pin 28 into one of a series of holes 29 along the length of the stabilizing leg 26, the pin also extending through a rotating hole in the left pocket 22 so as to retain the leg at the selected elevation.

Figure 2:
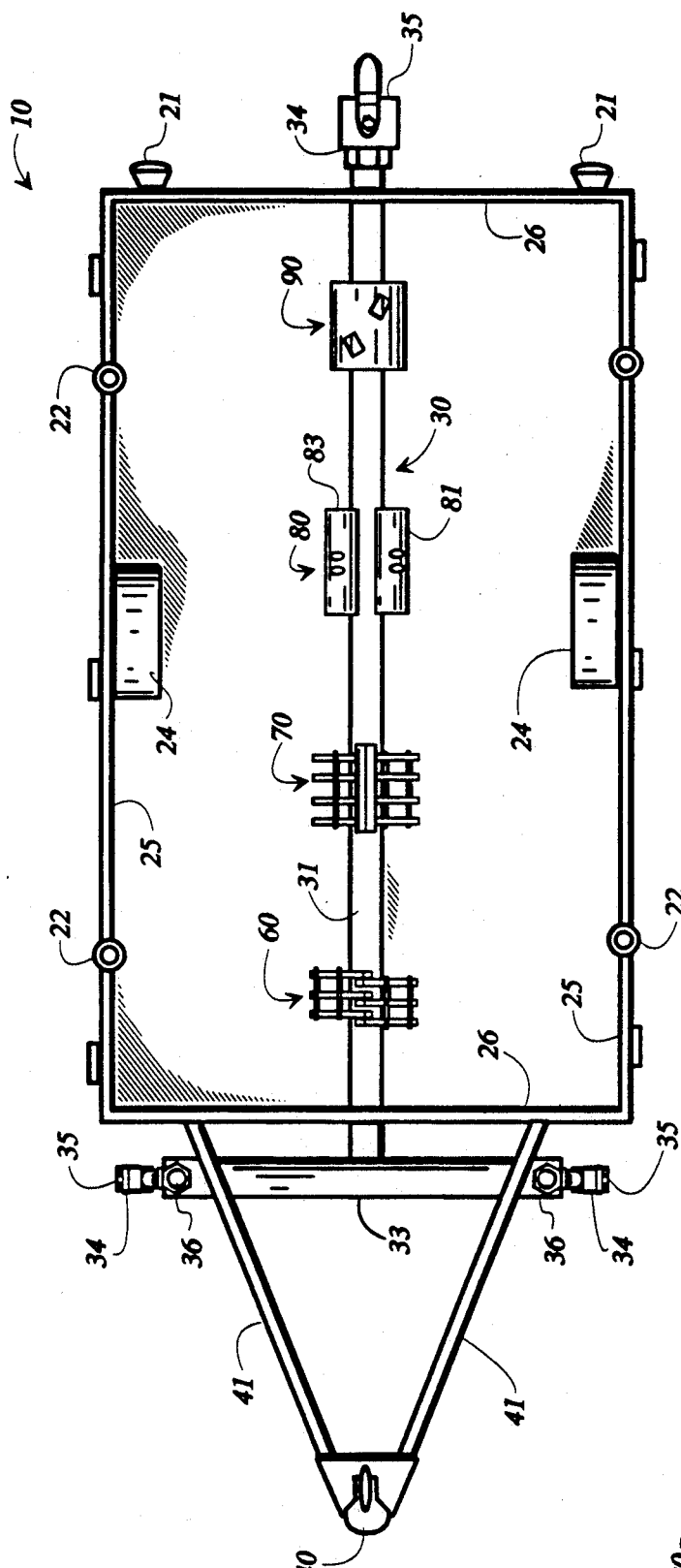
FIG. 2 is a top plan view of the embodiment shown in FIG. 1.

FIG. 2 illustrates the drainage system 30 comprising a drain pipe 31 running the length of the container 20 along the bottom of the container 20 parallel to and midway between two sides 25. The ends of the drain pipe 31 extend through the sides 26 of the container 20 at the front and back ends of the container 20. In the interior of the container 20, the drain pipe 31 contains a multitude of openings 32 for removing liquid from the container. The openings 32 comprise vents 39 and intake holes 38 (depicted in FIG. 2A) and are sized such that a maximum amount of liquid can be extracted through the intake holes 38.

Where the drain pipe 31 extends through the front wall 26 of the container 20, the drain pipe is coupled to a traverse header pipe 33 which distributes the liquid to two hose couplings 35 at the downstream sides of the corresponding outlet valves 34. Each outlet valve 34 may be closed or opened by a control handle. Air bleed risers 36 are positioned on the header pipe 33 in front of the outlet valves 34 to allow bleeding air from the drain pipe 31 and the header 33 before instituting pumping through one or more hoses (not shown) connecting a pumper to the couplings 35. Where the drain pipe 31 extends out the rear side 26 of the container 20, there is also an outlet valve 34 connected to a hose coupling 35. This allows for three sources from which to pump liquid from the container 20.

Figure 2A:
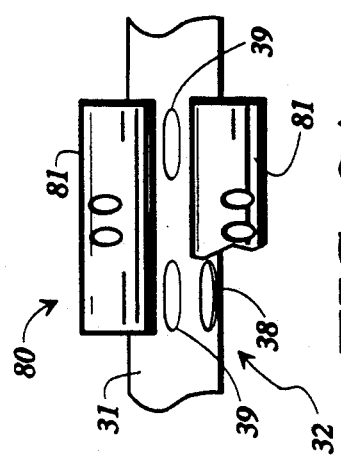
FIG. 2A is a cut away view of a preferred embodiment of an anti-whirlpool device.

FIG. 2 illustrates the position of the several different embodiments of whirlpool prevention devices, numbered here as 60, 70, 80, and 90. The anti-whirlpool baffles are placed along the drain pipe 31 so that the baffles confront or surround the openings 32 as depicted in FIG. 2A. FIG. 2A also serves to illustrate the relative sizes of the intake holes 38 and the vents 39 found along the length of the drain pipe 31.

Figure 3:
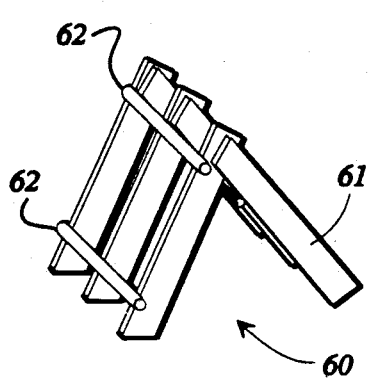
FIGS. 3-6 are perspective views of several alternative embodiments of the anti-whirlpool device.

FIG. 3 depicts a co-preferred embodiment of an anti-whirlpool baffle 60 comprising a plurality of inverted V-shaped members 61 spaced apart and connected in sequence to one another by perpendicular supporting rods 62 attached perpendicular to and spaced apart along the length of one arm of each V-shaped member 61.

Figure 4:
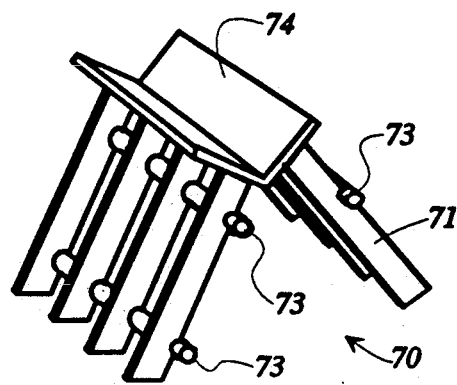

FIG. 4 depicts a co-preferred embodiment of an anti-whirlpool baffle 70 having a V-shaped trough 74 at its apex, from which extend a plurality of flat bars 71 spaced apart and connected to the underside of the trough. The bars 71 are connected to and spaced apart from one another by perpendicular supporting rods 73 which are parallel to the trough 74 and spaced apart along the length of the bars 71. As seen in FIG. 2, the anti-whirlpool baffle 70 is mounted along side the drain pipe 30 with the trough 74 disposed in radial spaced relation to a intake hole 38 in the pipe 31. The trough 74 thus acts as a barrier interposed between the intake hole 38 in the drain pipe and the surface of liquid in the container 20. This barrier, together with the plurality of suction paths defined between the flat sides of the bars 71, inhibit or prevent whirlpools from forming between the intake hole 38 and the liquid surface. The anti-whirlpool baffle 70 may be layered over a second anti-whirlpool baffle of smaller proportions.

Figure 5:
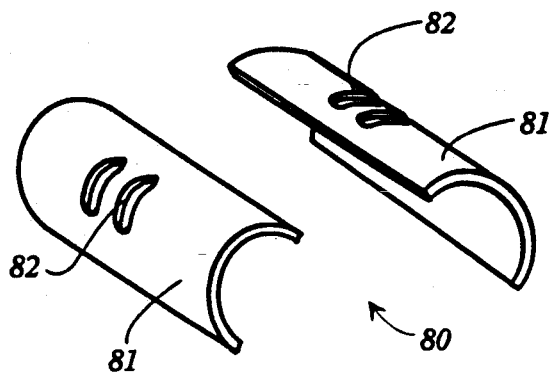

FIG. 5 depicts the anti-whirlpool device 80 comprising a pair of elongate C-shaped members 81 having a plurality of openings 82 extending through the member approximately midway along their length. As seen in FIG. 2, the C-shaped members 81 are located on opposite sides of the pipe 31 in radial spaced relation to the pipe, and at least one opening 32 is formed in the pipe behind each C-shaped member. These openings 32 are offset longitudinally behind the C-shaped members 81 from the openings 82 in the C-shaped members, so as to preclude a whirlpool-conducive straight path from the suction openings 32 to the surface of liquid in the container 20. Liquid thus flows to each opening 32 along paths through the openings 82 in the C-shaped member 81, and through the open spaces 83 between the pipe 31 and each of the members, neither path being a straight-line flow to the suction opening.

Figure 6:
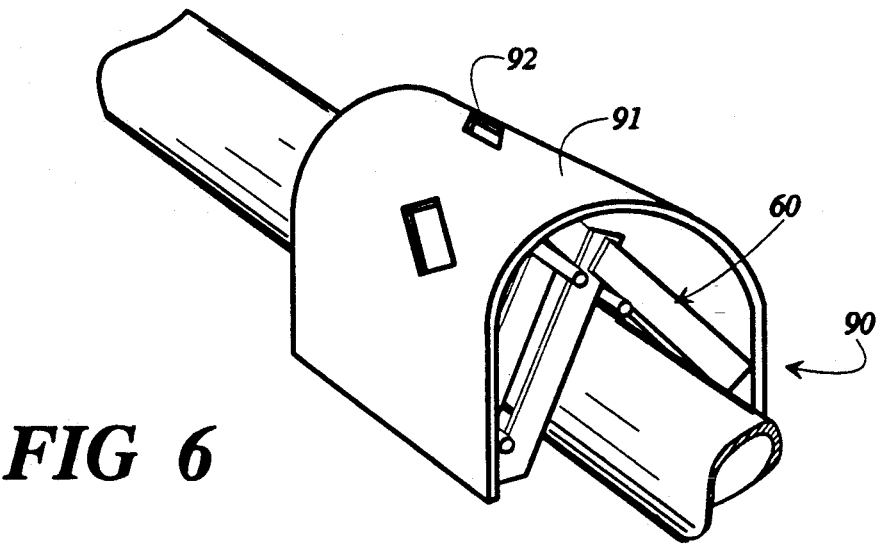

FIG. 6 depicts a fourth co-preferred embodiment of an anti-whirlpool baffle 90 layered over a second anti-whirlpool baffle 60. The anti-whirlpool baffle 90 comprises an inverted U-shaped member 91 having a plurality of openings 92. The device 90 is placed over the drain pipe 31 so that the openings 32 are covered by the device 90 however, the device 90 is spaced apart from the drain pipe 31.

The portable liquid reservoir 10 is transported by attaching it to a vehicle via a hitch 40. Upon arrival at a desired location, the reservoir 10 is disconnected from the towing vehicle and maneuvered to a desired location. The stabilizing legs 26 are then withdrawn from the leg pockets 22 to a height such that the feet 27 are in contact with the surface upon which the reservoir 10 rests, with the bottom of the container 20 preferably being substantially level. The legs 26 are then locked into position by means of removable pegs 28 inserted into holes 29 through the legs 26. Liquid is then dumped into the container 20 via tanker or another available source, through the open top of the container.

When the liquid is to be drained from the container 20, hoses are coupled to the header pipe 33 via the couplings 35. The air bleed risers 36 are momentarily opened to allow any trapped air to escape, and the pumper truck may begin pumping liquid from the reservoir 10.

While this invention has been described in detail with particular reference to a preferred embodiment thereof, it will be understood that variations and modifications can be effected within the spirit and scope of the invention as described herein before and as defined in the appended claims.

What is claimed is:

1. A liquid reservoir trailer vehicle comprising:

an open container having a lower portion and an upper portion wherein said lower portion is mounted on a means for transporting said open container and wherein said upper portion comprises a plurality of sides extending upwardly from the lower portion to contain a certain amount of liquid;

a liquid drainage system comprising a drain pipe disposed along said lower portion of said open container and having at least one suction opening positioned inside said open container, said drain pipe extending out through an end of said open container;

a water distribution system wherein said drain pipe is connected to a second pipe outside the end of said open container mounted on said transporting means and wherein said second pipe contains means for controlling release of liquid from said open container; and whirlpool prevention means comprising at least one perforated enclosure attached in spaced-apart and confronting relation to said drain pipe such that said perforated enclosure overlies a length of said drain pipe as well as said suction opening.

2. The liquid reservoir trailer vehicle of claim 1, wherein said lower portion slopes toward said drain pipe.

3. The liquid reservoir trailer vehicle of claim 1, wherein said drain pipe contains a plurality of said suction openings.

4. The liquid reservoir trailer vehicle of claim 1, wherein said perforated enclosure comprises a half sleeve having a plurality of openings, said half sleeve fitting around said drain pipe in radially spaced relation to said suction openings.

5. The liquid reservoir trailer vehicle of claim 1, wherein said perforated enclosure comprises an inverted V-shaped member having plural inverted V-shaped elements spaced apart from and connected to one another by rods transecting the width of said V-shaped member and perpendicular to the individual V-shaped elements.

6. The liquid reservoir trailer vehicle of claim 1, wherein said perforated enclosure comprises an inverted V-shaped member having a V-shaped trough at the apex from which extend a plurality of legs spaced apart from and connected to one another by members parallel to said V-shaped rough and transecting said legs in a perpendicular manner.

7. The liquid reservoir trailer vehicle of claim 1, wherein said perforated enclosure comprises a pair of elongated C-shaped members having a plurality of openings positioned such that said C-shaped members are spaced apart and face on another.

8. The liquid reservoir trailer vehicle of claim 1, wherein said perforated enclosure comprises an inverted elongated U-shaped member.

9. The liquid reservoir trailer vehicle of claim 4, wherein at least two of said perforated enclosures are layered one on top of another.

10. A liquid reservoir trailer vehicle for receiving, holding and distributing liquid for use in fire fighting, comprising:

means defining a tank for receiving and holding a quantity of liquid, said tank having a bottom and having a top substantially open to facilitate rapid filling of said tank with liquid;

drainage means mounted adjacent said bottom of said tank and including a suction opening for withdrawing liquid from said tank; and at least one perforated enclosure attached in spaced-apart and confronting relation to said suction opening such that said perforated enclosure overlies a length of said drainage means as well as said suction opening so as to block a nominal path from the suction opening to the surface of the liquid thereby inhibiting formation of suction whirlpools in the liquid within said tank when liquid is withdrawn through said suction opening.

11. The liquid reservoir trailer vehicle of claim 10, wherein:

said perforated enclosure defines plural paths of liquid flow from said suction opening to the liquid surface so that flow along any individual path is less than total flow into said suction opening.

12. The liquid reservoir trailer vehicle of claim 10, wherein:

said drainage mounted adjacent the bottom of said tank comprises a drain pipe having at least one end extending through an end of said tank to a coupling; and a plurality of said suction openings is in spaced-apart relation along said drain pipe inside said tank.

13. The liquid reservoir trailer vehicle of claim 10, wherein:

said tank means comprises a trailer including wheels for supporting the trailer on the ground, and means for coupling the trailer to another vehicle for towing; and means selectively operative to support said trailer on the ground independently of the wheels, so that the weight of the trailer and the liquid therein is substantially removed from the wheels when said tank is in use for holding liquid.

14. The liquid reservoir trailer vehicle of claim 13, further comprising:

an air bleed riser in communication with said drain pipe adjacent a coupling and extending upwardly therefrom to an upper end above said drain pipe; and a valve associated with said air bleeder riser to selectively open said air bleed riser and allow water from said tank to enter said drain pipe at least to the point of communication with said air bleed riser, thereby releasing air from said drain pipe.

* * * * *